(No Model.)

E. M. BENTLEY.
ELECTRIC CABLE.

No. 302,377. Patented July 22, 1884.

ATTEST.  
J. Henry Kaiser.  
Geo. T. Smallwood.

INVENTOR.  
Edward M. Bentley

UNITED STATES PATENT OFFICE.

EDWARD M. BENTLEY, OF BROOKLYN, NEW YORK.

ELECTRIC CABLE.

SPECIFICATION forming part of Letters Patent No. 302,377, dated July 22, 1884.

Application filed December 15, 1883. (No model.)

*To all whom it may concern:*

Be it known that I, EDWARD M. BENTLEY, a citizen of the United States, residing at Brooklyn, New York, have invented certain new and useful Improvements in Electric Cables, of which the following is a specification, reference being made to the accompanying drawings, in which—

Figures 1, 2, 3, 4, and 5 are side views, and Figs. 6, 7, 8, and 9 are end views, of various forms of my cable.

The present invention is an improvement on the device for which Letters Patent of the United States were granted me May 1, 1883. In said patent each direct and the common return lines of a multiple cable were so arranged that each direct and the common return were equally distant from any line external to them. My cable herein described preserves the above arrangement, with the additional provision that each direct and the common return are equally distant from any other direct line in the cable, as well as from any line external to the cable. This arrangement is more perfectly attained when a small number of direct wires are used with a common return. I therefore generally employ two or three direct wires with a common return therefor, which I make up into a small cable, which may be called a "unit-cable," for a large number of them may be combined into a large cable.

Figure 1:
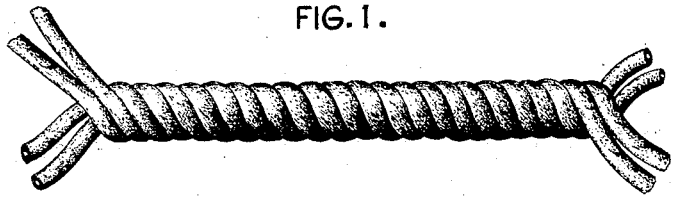
Figure 2:
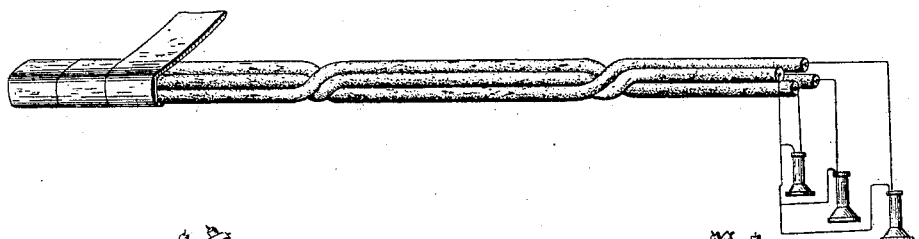
Figure 9:

Figs. 1 and 2 show a cable made up of four wires insulated from one another and twisted together throughout their whole length, as shown in Fig. 1, or at intervals, as in Fig. 2. One of them will be used as a common return for the rest, and it will be seen that because of the twist each direct and the common return wire will be substantially equidistant from any external wire, as A, and an examination of the end view, Fig. 7, will show that any direct and the common return will be very nearly equally distant from any other direct. Thus $b$ and $d$ are for all practical purposes equally distant from $a$, $d$ being the common return for the others. If, instead of four wires, but three are used—one a common return for the other two—the above conditions will be perfectly attained. Thus in Fig. 6, $a$ and $b$ are exactly equidistant from $c$. For some purposes a larger number of direct lines may be used for one common return, the return being placed in the center and the direct lines wound spirally thereon. The above conditions will then be more or less perfectly attained. Fig. 9 is a section of a large cable made up of a number of unit-cables such as described.

Figure 3:
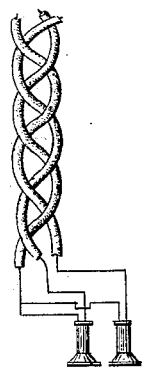
Figure 6:
Figure 4:
Figure 7:
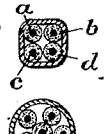
Figure 8:
Figure 5:

Figs. 3 and 4 show a unit-cable made by braiding the lines together, there being three wires in the first and four wires in the second. This cable will be found especially useful in placing telephone-wires under ground, or in other situations where they are subject to inductive disturbance from other lines and from one another.

What I claim as my invention is—

1. The combination of a number of direct conductors and a common return therefor, each direct and the common return being equally distant from any wire external to the system, and also from any other direct conductor.

2. The combination of three or more wires insulated and twisted or braided about one another, one of them being employed as a common return for the others.

In witness whereof I have hereunto set my hand this 11th day of December, A. D. 1883.

EDWARD M. BENTLEY.

Witnesses:
 HARRY E. KNIGHT,
 A. E. TRUMBULL.